July 21, 1964
R. L. DICKEY
3,141,453
WORK HOLDER OR WORK JIG
Filed March 19, 1962
2 Sheets-Sheet 2
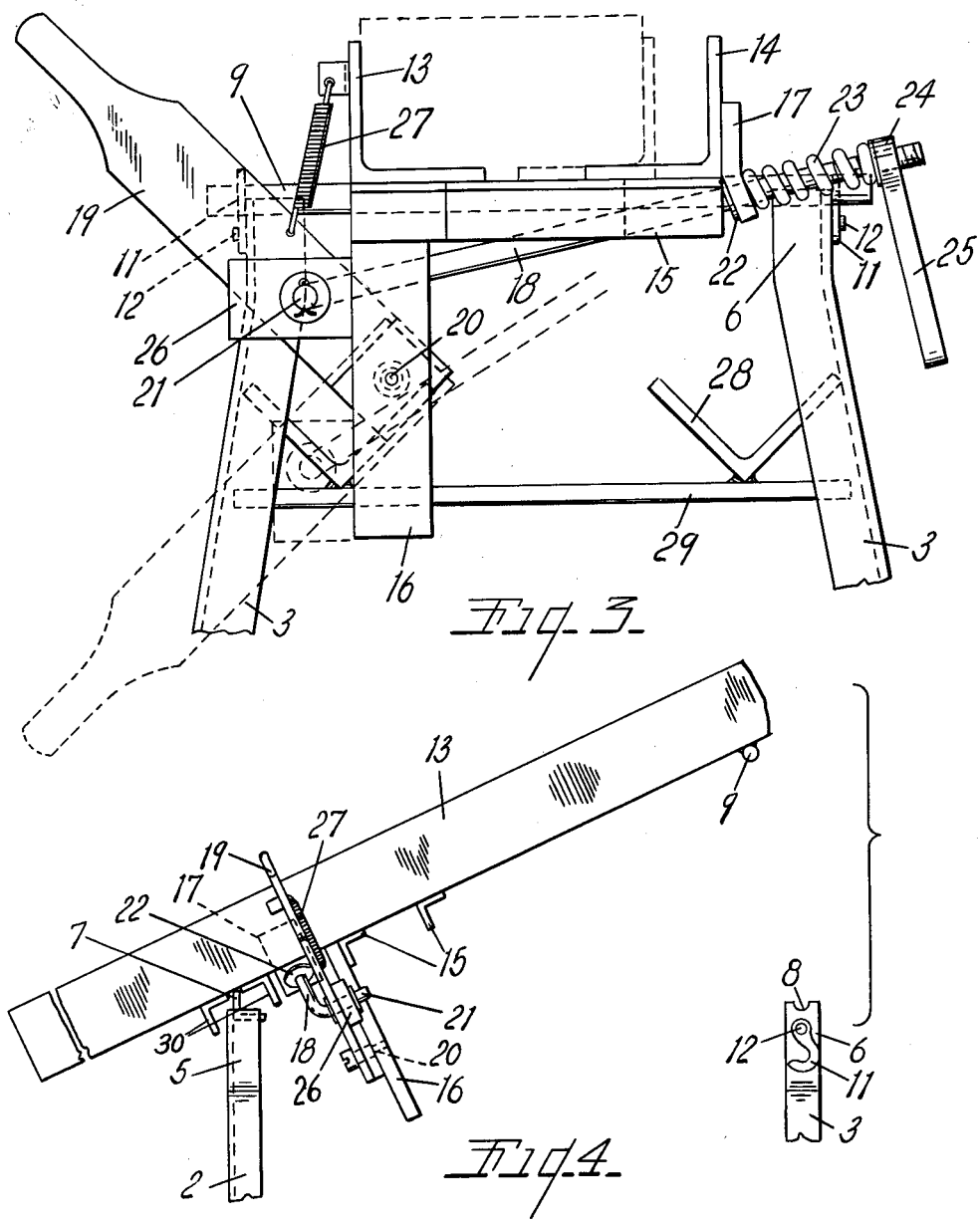
INVENTOR.
Roger L. Dickey
BY
ATTORNEY

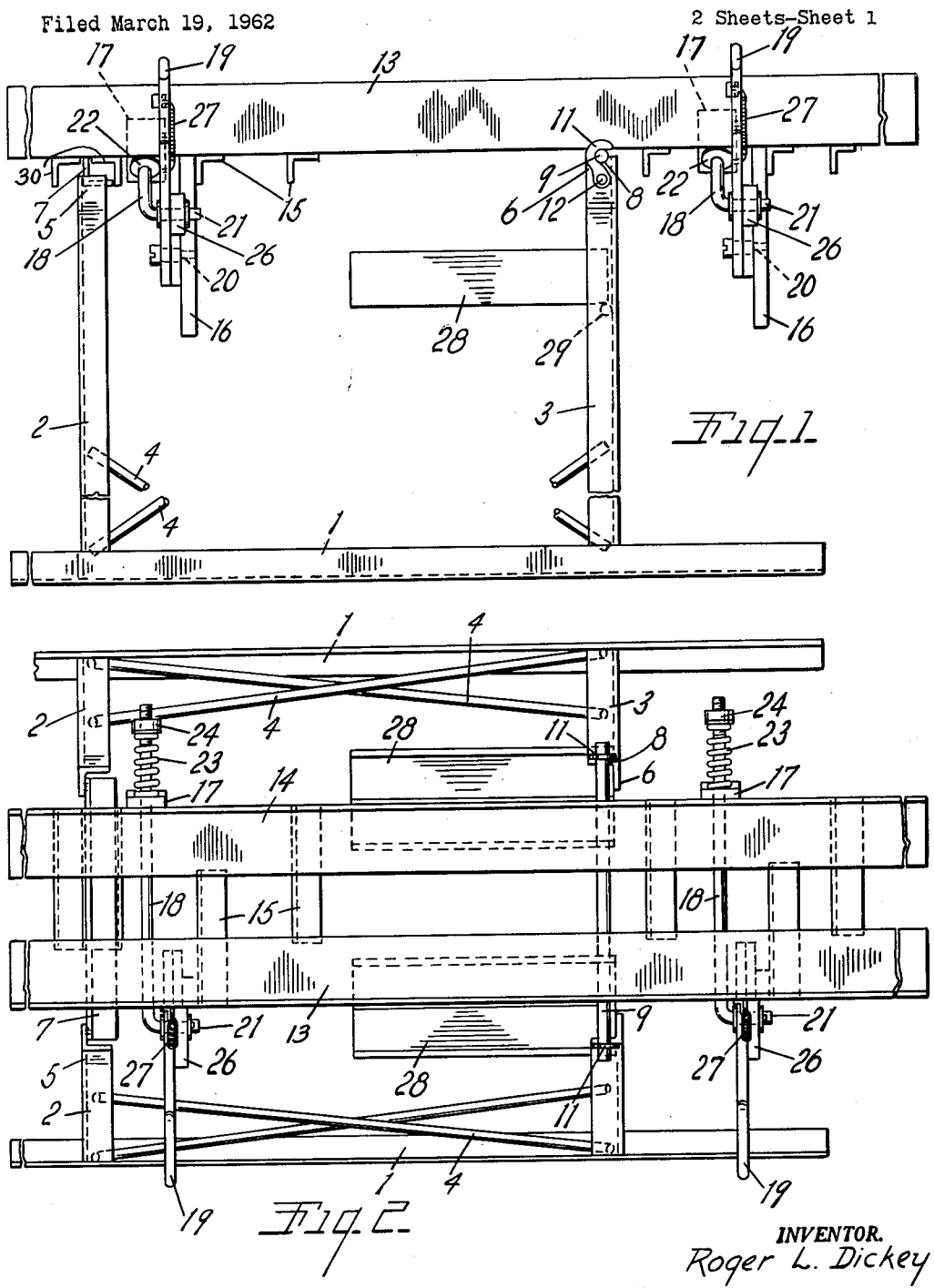

United States Patent Office 3,141,453
Patented July 21, 1964

3,141,453
WORK HOLDER OR WORK JIG
Roger L. Dickey, R.R. 2, Box 214, Hartford City, Ind.
Filed Mar. 19, 1962, Ser. No. 180,692
10 Claims. (Cl. 125—35)

This invention relates to a work holder or jig well adapted for the handling of heavy material, such for example as stone, for work thereon.

The main objects of this invention are:

First, to provide a work holder which is well adapted for holding heavy articles, such as stone or blocks of concrete and the like, which substantially reduces the manual effort in the handling of same.

Second, to provide a work holder or jig which may be very quickly adjusted to clampingly secure the work and to release the work and to effectively hold and support work of widely varying dimensions.

Third, to provide a work holder having these advantages which facilitates work on the material and which is capable of handling work of widely varying sizes.

Fourth, to provide a work holder having these and other advantages which will appear from the following description which is simple and economical in structure and at the same time strong and durable and capable of handling heavy loads.

Objects relating to details and economies of the invention will appear from the description to follow. The invention is defined and pointed out in the claims.

A preferred embodiment of the invention is illustrated in the accompanying drawing, in which:

FIG. 1 is a fragmentary side elevational view of a work holder or jig embodying my invention.

FIG. 2 is a fragmentary plan view.

FIG. 3 is a fragmentary end elevational view, the jig members being shown in retracted or open position by full lines and in closed or work clamping position by dotted lines, a piece of work being conventionally illustrated, by dotted lines, in clamped position.

FIG. 4 is a fragmentary side elevational view illustrating loading and unloading manipulations.

The embodiment of my invention illustrated is a commercial embodiment although certain of the parts are shown conventionally.

The embodiment of my invention illustrating the supporting frame comprises the base bars 1 and upwardly and inwardly converging standards 2 and 3. Braces 4—4 are arranged in crossed relation and fixedly secured to the standards adjacent their lower ends so that they do not obstruct the operator. The standards 2 and 3 have vertical portions 5 and 6 respectively at their upper ends.

Secured at the upper ends 5 of the standards 2 is a fixed jig supporting bar 7. The upper ends 6 of the standards 3 have upwardly facing notches 8 with which the rod-like jig support bar 9 is detachably engaged. This bar 9 is detachably secured to the standards 3 by the hooks 11 pivotally mounted on the standards at 12.

The front and rear jig members 13 and 14 are of inwardly and upwardly facing angled section and in the embodiment illustrated, each jig member is provided with a plurality of longitudinally spaced strut members 15 disposed on the underside thereof and projecting laterally therefrom to project below and with which the other jig member is in slidable supported relation. These struts prevent outward tilting movement of the jig members relative to each other when they are adjusted to clamping the work. Also, it will be noted that a pair of lugs 30 are disposed at the left end of the jig to prevent longitudinal movement of the jig members relative to supporting standards, see FIGS. 1 and 4. However, as is pointed out, the jig supporting bar 9 is detachably secured to the standards 3 by the hooks 11 and it is fixedly secured to the jig member 13 so that the jig unit may be tilted on the supporting bar 7, as is illustrated in FIG. 4, to facilitate loading and unloading the jig members.

As stated, the applicant's work holder or jig is well adapted for the handling of heavy materials, such for example, as stone or like materials, and the tilting for loading and unloading is very desirable and greatly reduces labor. Such tilting for loading and unloading is however, broadly considered, illustrated in the applicant's pending application for patent, Serial No. 29,271, filed May 16, 1960, now Patent No. 3,060,917, issued October 30, 1962.

The front jig member 13 is provided with laterally spaced downwardly projecting arms 16 which are fixedly secured thereto and the rear jig member has downwardly projecting lugs 17 disposed in generally opposed relation to the arms 16. Rods 18 are slidably disposed through the lugs 17 and project downwardly and forwardly therefrom. The jig adjusting levers 19 are pivotally mounted at 20 on the downwardly projecting arms 16 and the rods 18 have laterally turned forward end portions 21 disposed through the levers in spaced relation to their pivots. The pivotal connections for the rods 18 to the levers are such that the rods are swung transversely across the support pivots for the levers in opening and closing adjustment thereof as is illustrated in FIG. 3. The rods 18 are provided with thrust members 22 at the inner sides of the lugs 17. Coiled springs 23 are arranged on the rods at the rear of the lugs 17 in thrust engagement with the nuts or abutment members 24 threaded upon the rods and desirably provided with hand pieces 25.

The levers 19 are provided with stops 26 which engage the arms 16 when the parts are adjusted to both open and closed position. See the full and dotted lines in FIG. 3.

Coiled springs 27 are connected to the front jig member 13 and to the levers 19 and serve to hold the levers in their retracted position and facilitate the separating movement of the jig members.

It will be understood that the terms "front" and "rear" are used for convenience in describing the parts in their relation to each other but that workmen commonly work on both sides of the apparatus as that is commonly desirable for most pieces of work.

The tool holders at 28 face upwardly and they are mounted on the crossrod 29 extending between the standards 3.

While certain parts are shown conventionally in the accompanying drawings, it should be understood that the structure illustrated in these drawings is a commercially desirable structure.

As stated, the accompanying drawings illustrate a commercial embodiment of the applicant's invention. Other adaptations or modifications are not disclosed as it is believed that this disclosure will enable those skilled in the art to embody or adapt my invention as may be desired.

Having thus described the invention, what is claimed as new and desired to secure by Letters Patent is:

1. A work holder comprising a jig supporting frame including laterally spaced longitudinal base bars, laterally spaced pairs of standards mounted on said base bars and having vertical portions at their upper ends, jig supporting bars on the upper ends of said standards, elongated front and rear jig members of angled section disposed in upwardly and inwardly facing relation supportedly mounted on said jig supporting bars, the front jig member having laterally spaced downwardly projecting arms thereon, the rear jig member having correspondingly spaced downwardly projecting lugs thereon, levers pivotally mounted on said arms, rods slidably disposed through said lugs and pivotally connected to said levers in laterally spaced relation to their pivotal connection to said arms and so that said rods are swung transversely across the supporting pivots of the levers as the levers are adjusted to and from actuated position, said rods being provided with thrust members disposed thereon at the inner sides of said lugs, and coiled springs mounted on said rods at the outer sides of and in thrust supporting engagement with said rod supporting lugs.

2. A work holder comprising a jig supporting frame including laterally spaced pairs of standards, jig supporting bars on the upper ends of said standards, elongated front and rear jig members of angled sections disposed in upwardly and inwardly facing relation supportedly mounted on said jig supporting bars, the front jig member having laterally spaced downwardly projecting arms thereon, the rear jig member having correspondingly spaced downwardly projecting lugs thereon, levers pivotally mounted on said arms, rods slidably disposed through said lugs and pivotally connected to said levers in laterally spaced relation to their pivotal connection to said arms and so that said rods are swung transversely across the supporting pivots of the levers as the levers are adjusted to and from actuated position, said rods having thrust engagement with the inner sides of said lugs, springs mounted on said rods at the outer sides of and in thrust supporting engagement with said rod supporting lugs, stops on said levers engageable with said arms when the levers are in their actuated and retracted positions, and springs acting to hold the levers in their retracted positions.

3. A work holder comprising a jig supporting frame including laterally spaced pairs of standards, supporting bars on the upper ends of said standards, elongated front and rear jig members of angled section disposed in upwardly and inwardly facing related supportedly mounted on said jig supporting bars, the front jig member having laterally spaced downwardly projecting arms thereon, the rear jig member having correspondingly spaced downwardly projecting lugs thereon, levers pivotally mounted on said arms, rods slidably disposed through said lugs and pivotally connected to said levers in laterally spaced relation to their pivotal connection to said arms, and springs mounted on said rods at the outer sides of and in thrust supporting engagement with said rod supporting lugs.

4. A work holder comprising a jig supporting frame including laterally spaced pairs of standards, jig supporting bars mounted on the upper ends of said standards, elongated front and rear jig members supportedly mounted on said jig supporting bars, each jig member having a plurality of longitudinally spaced strut members mounted on the under side thereof and projecting laterally therefrom in underlapping supported relation to the other jig member, the front jig member having laterally spaced downwardly projecting arms thereon, the rear jig member having correspondingly spaced downwardly projecting lugs thereon, levers pivotally mounted on said arms, rods slidably disposed through said lugs and connected to said levers in laterally spaced relation to the pivotal connection to said arms, said rods being provided with thrust members disposed thereon at the inner sides of said lugs, coiled springs mounted on said rods at the outer sides of and in thrust supporting engagement with said rod supporting lugs, and abutment members on said rods for the outer ends of said springs.

5. A work holder comprising pairs of jig supporting standards, a first jig supporting bar mounted on one pair of said standards, the other pair of standards having upwardly facing recesses therein, a jig supporting bar secured to one of said jig members and removably engageable with said recesses, elongated front and rear jig members tiltably mounted on said first jig supporting bar, each jig member having laterally spaced strut members mounted on the underside thereof and projecting therefrom in supporting relation to the other jig member, the front jig member having downwardly projecting arms thereon, jig opening and closing levers pivotally mounted on said arms, and rods connected to said levers to be actuated thereby and having springably yielding jig closing connection to the rear jig member and having thrust jig opening engagement with said rear jig member so that the jig members are actuated to closed position when said levers are actuated in one direction and to open position when the levers are retracted.

6. A work holder comprising pairs of jig supporting standards, a jig supporting bar mounted on one pair of said standards, the other pair of standards having upwardly facing recesses therein, a jig supporting bar removably engageable with said recesses, elongated front and rear jig members mounted on said supported bars, the front jig member having downwardly projecting arms thereon, jig opening and closing levers pivotally mounted on said arms, and rods connected to said levers to be actuated thereby and having springably yielding jig closing connection to the rear jig member and having thrust jig opening engagement with said rear jig member so that the jig members are actuated to closed position when said levers are actuated in one direction and to open position when the levers are retracted.

7. A work holder comprising a jig support means, elongated laterally spaced front and rear jig members one of which is adjustably mounted on said jig support means, the jig members having laterally spaced strut members on the undersides thereof projecting laterally therefrom in supporting relation to the other jig member, the front jig member having downwardly projecting arms thereon, jig opening and closing levers pivotally mounted on said arms, and rods operatively connected to said levers to be reciprocated by the adjustment of the levers and having springably yielding jig closing connection to the other jig member and thrust engagement therewith for opening said jig members.

8. A work holder comprising a jig support member, elongated front and rear jig members, the rear jig member being adjustably mounted on said jig support member, the front jig member having downwardly projecting arms thereon, jig opening and closing levers pivotally mounted on said arms, and rods operatively connected to said levers to be reciprocated by the adjustment of the levers and having springably yielding jig closing connection to the other jig member and thrust engagement therewith for opening said jig members.

9. A work holder comprising jig support means, elongated jig members of angled section disposed in upwardly and inwardly facing relation to each other, at least one of said jig members being slidably mounted on said support means for adjustment to and from the other jig member, jig opening and closing levers pivotally mounted on one of said jig members, and rods disposed transversely of and below said jig members and pivotally connected to said levers and having slidable springably yielding connection to the other jig member so that the jig members are urged to springably yielding clamping engagement with work when the lever is actuated to close the jigs, said rods being provided with jig member engaging abutments disposed so that the jig members are opened when the levers are retracted.

10. A work holder comprising a jig supporting frame including laterally spaced pairs of standards, a jig supporting bar fixedly mounted on one pair of said standards, a jig supporting bar releasably engageable with the other pair of standards, elongated front and rear jig members of angled section disposed in upwardly and inwardly facing relation supportedly mounted on said supporting jig bars, said jig members having downwardly projecting members disposed on opposite sides of said fixed support bar preventing longitudinal movement of said jig members thereon, said releasable jig supporting bar being fixedly mounted on one of said jig members, the other jig member being slidably associated therewith, and means supportedly mounted on said jig bars independent of said standards for adjusting said jig members to and from each other while supportedly engaged by said jig supporting bars, said removable jig supporting bar permitting the tilting of said jig members to facilitate placement and removal of work thereon.

References Cited in the file of this patent
UNITED STATES PATENTS 2,841,196    Zazdrzyk _____ June 1, 1958